United States Patent [19]

Behrens

[11] Patent Number: 4,461,711

[45] Date of Patent: Jul. 24, 1984

[54] METHOD FOR SEPARATING AND COLLECTING IODINE

[75] Inventor: Horst Behrens, Munich, Fed. Rep. of Germany

[73] Assignee: Gesellschaft fur Strahlen- und Umweltforschung mbH, Fed. Rep. of Germany

[21] Appl. No.: 354,645

[22] Filed: Mar. 4, 1982

[30] Foreign Application Priority Data

Mar. 10, 1981 [DE] Fed. Rep. of Germany ....... 3108991

[51] Int. Cl.³ .............................................. B01D 15/04
[52] U.S. Cl. ................................... 210/757; 210/758; 210/807; 55/98
[58] Field of Search ............... 210/807, 753, 757, 758, 210/682, 683, 694; 55/71, 98; 423/241, 503

[56] References Cited

U.S. PATENT DOCUMENTS

| | | | |
|---|---|---|---|
| 1,774,882 | 9/1930 | Girvin | 423/503 |
| 1,897,031 | 2/1933 | Chamberlain | 423/503 |
| 1,922,693 | 8/1933 | Chamberlain | 423/503 |
| 2,009,956 | 7/1935 | Chamberlain et al. | 423/503 |
| 3,436,344 | 4/1969 | Canning et al. | 210/694 |
| 4,088,737 | 5/1978 | Thomas et al. | 423/241 |
| 4,275,045 | 6/1981 | Anav et al. | 423/503 |

*Primary Examiner*—Charles N. Hart
*Assistant Examiner*—Wanda L. Millard
*Attorney, Agent, or Firm*—Sughrue, Mion, Zinn, Macpeak, and Seas

[57] ABSTRACT

A process for separating and collecting iodine from a liquid phase comprising adding an acid is to the liquid phase, and then conducting the liquid phase through an activated carbon filter.

16 Claims, No Drawings

METHOD FOR SEPARATING AND COLLECTING IODINE

BACKGROUND OF THE INVENTION

The present invention relates to a method for separating and collecting iodine from the liquid phase as well as to the utilization of same.

It is known in inorganic chemistry that iodine mixed with pure neutral iodate is used, in solution, for the quantitative analysis of acids. The acidification of iodide or iodate solutions alone, however, is not sufficient to release iodine. It is also known that free iodine can easily be adsorbed at activated carbon.

A number of processes are known for collecting iodine, such as, for example, the adsorption process which employs activated carbon, silver charged activated carbon or other, preferably silver charged sorbents (e.g. K. Lieser and W. Hild, "Separation of Iodine from Fission Product Solutions with Silver Chloride on Silica Gel", Radiochimica Acta 7 (1967) 74-77). Still other processes for collecting iodine are the process which employs ion exchangers, the precipitation and coprecipitation processes, and the extraction process. Most of these processes cover only certain chemical forms of iodine, such as, for example, the process in which there is a fixation of iodide at silver chloride. Moreover, some of them have limited reaction rates, such as, for example, the ion exchange process, or they permit treatment of volumes of water only in batches, such as, for example, the precipitation processes.

SUMMARY OF THE PRESENT INVENTION

It is an object of the present invention to accomplish a separation and collection of iodine from a liquid phase, which can be water, in such a manner that it takes place as quickly as possible, as completely as possible and as independently as possible from the chemical form of the iodine.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for separating and collecting iodine from a liquid phase which comprises adding an acid to the liquid phase, and then conducting the liquid phase through an activated carbon filter.

It is to be understood that both the foregoing general description and the following detailed description are exemplary, but are not restrictive of the invention.

DETAILED DESCRIPTION OF THE PRESENT INVENTION

The separation and collection of iodine takes place, according to the present invention, by filtration through activated carbon. The activated carbon can be an activated carbon which is impregnated with silver or can be an unimpregnated activated carbon. Silver containing activated carbon can be used particularly if the iodine is to be fixed as permanently and completely as possible, as, for example, in the decontamination of radioactive waters.

In accordance with the present invention, the liquid phase, which can be water, from which the iodine is to be separated, receives, before the filtration through the activated carbon, the addition of an acid so as to reduce the pH of the liquid phase. The acidification preferably is achieved by sulfuric acid. The invention is also applicable for the separation of iodine from a gaseous phase. In this case the addition of an acid is made by dosing of acid vapor to the gas stream or by impregnation of the filter material with liquid acid.

The present invention is based on the discovery that the acidified liquid phase (acid aqueous solution) formed in the practice of the present invention causes fast chemical reactions between the iodine and the surface of the activated carbon, which reactions enhance the separation of iodine from, for example, the water. The liquid phase which is being treated according to the present invention can contain one or more iodine containing compounds which can be of the same type or different types. Thus, for example, the liquid phase can contain inorganic iodides and iodates and organic iodine compounds. As used herein, the terms "iodide(s)" and "iodate(s)" refer to inorganic compounds. In general, the same operating conditions can be used to treat the different types of compounds.

When the liquid phase which is being treated in accordance with the present invention contains iodide, the iodide is catalytically oxidized to free iodine which is then easily adsorbed at the activated carbon. For this oxidation, free oxygen may also be dissolved in the liquid in stoichiometric excess in comparison to iodine or respectively an oxidation agent, e.g. $H_2O_2$, may be dosaged in the liquid phase which is being treated to aid in the oxidation. When the liquid phase which is being treated in accordance with the present invention contains iodate, the iodate is reduced by the activated carbon to free iodine. The free iodine is then, as is known, easily adsorbed at the activated carbon. When a silver containing activated carbon is used in the practice of the present invention, the iodine may further convert to the particularly difficulty soluble silver iodide. When the liquid phase which is being treated in accordance with the present invention contains iodine in the form of organic iodine compounds, as they form, for example, in natural waters from inorganic iodine, the iodine from the organic iodine compounds is fixed very substantially at the activated carbon under the above-described conditions.

The above described reactions already take place when the acidity of the liquid phase reaches a pH of 4. The rate of oxidation of iodide or reduction of iodate increases significantly with greater acidification and this increase has been observed up to a pH of about 1. For practical implementation of the process, acidification to, for example, a pH of 2 results in a rapid fixing of the iodine onto the activated carbon and avoids having to use too large quantities of acid for the acidification of the liquid phase.

The present invention provides a significant contribution to the art by recognizing that an acid environment in the adsorbing system creates the chemical reactions (oxidation, reduction) which take care of rapid conversion of various chemical forms of iodine into free iodine, probably with substantial or catalytic cooperation of the activated carbon surface. The resulting free iodine under these conditions, is seemingly chemically stable and there is a practically simultaneous adsorption of this iodine at the activated carbon surface.

A particular advantage of the present invention is the relatively high adsorption rate and the coverage of different iodine compounds under the same operating conditions. Moreover, the process of the present invention results in high decontamination factors and is suitable for continuous operation.

Enrichments have been performed, for example, with activated carbon columns having a filter volume of 200 ml. Merck No. 2515 activated carbon was used which, according to statements by the manufacturer, is a cocoanut coal. The coal was ground, sifted to various grain sizes, washed with acid and then again with water and dried. The production of silver containing activated carbon took place according to the following procedure:

Activated carbon ground to the appropriate grain size, washed with sulfuric acid, then washed with water and dried, is saturated with an ammoniacal silver nitrate solution, dried initially at about 70° C. and then heated to about 140° C. until it reaches a constant weight. The quantity of silver nitrate employed must correspond to the desired silver content, e.g. 0.0-2% silver.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE I

This example illustrates the separation of iodide from tap water in accordance with the present invention. An adsorber in the form of activated carbon containing 1% silver and having a grain size of 0.42 to 0.5 mm was used to treat tap water. The pH of the tap water was adjusted to 2.0 by dosing of sulfuric acid into the inlet of the column. The iodide concentration in the tap water resulted from the natural iodine content ($\sim 1$ ppb) and from the addition of an iodide carrier ($I^{131}$). The tap water was passed through the adsorber at three different flow rates, and the degree of separation of iodide was determined. The results were as follows:

| Flow Rate | Degree of Separation |
| --- | --- |
| 30 l/h | 99.999% |
| 65 l/h | 99.89% |
| 100 l/h | 99.6% |

EXAMPLE II

The procedure of Example I was repeated, except that the adsorber was activated carbon containing 1% silver and having a particle size range of 0.31 to 0.42 mm. At a flow rate of 100 l/h, the degree of separation was 99.97%.

EXAMPLE III

This example illustrates the separation of iodate from tap water. The adsorber was in the form of activated carbon having a 1% silver content and a particle size range of 0.42 to 0.5 mm. The pH of the tap water was adjusted to 2 by dosing of sulfuric acid, and the iodate concentration in the tap water resulted from the addition of radioactive iodate without carrier ($I^{131}$). The tap water was passed through the adsorber at three different flow rates, and the degree of separation of iodate was determined. The results were as follows:

| Flow Rate | Degree of Separation |
| --- | --- |
| 30 l/h | 99.94% |
| 65 l/h | 98.3% |
| 100 l/h | 96.3% |

EXAMPLE IV

The procedure of Example III was repeated, except that the adsorber was activated carbon containing 1% silver and having a particle size range of 0.21 to 0.31 mm. The results were as follows:

| Flow Rate | Degree of Separation |
| --- | --- |
| 30 l/h | 99.995% |
| 65 l/h | 99.89% |
| 100 l/h | 99.1% |

The above experiments were repeated at a pH of 2, except that the activated carbon did not contain any silver. Initially iodate is separated from the water at a pH of 2 similarly well with unsilvered activated carbon as with silvered activated carbon. However, during further rinsing, about 20 times as much iodine appears in the wash water (effluent) with unsilvered activated carbon as with silvered activated carbon.

EXAMPLE V

This example illustrates the separation of radioactive iodine from river water in which the iodine is in organically bound form. The iodine concentration resulted from the natural iodine content and from the addition of carrier free radioiodine ($J^{131}$).

The adsorber used was an activated carbon containing 1% silver and having a particle size range of 0.315 to 0.42 mm. The river water was passed through the adsorber at a flow rate of 100 l/h and had a period of dwell of 7.2 seconds in the adsorber. Three identical tests were made, except that the river water had a different pH by dosing sulfuric acid in each test. The results were as follows:

| pH | Degree of Separation |
| --- | --- |
| 7.2 | 85.1% (only for illustration) |
| 3.6 | 94.0% |
| 2.0 | 97.6% |

EXAMPLE VI

Tap water innoculated with radioactive iodide instantaneously at the beginning was treated in a separating column having a content of 200 ml of unsilvered activated carbon as the adsorber. The activated carbon had a particle grain size of 0.21 to 0.31 mm. The water was passed through the column at a flow rate of 65 l/h. The total throughput was 80e. Acid was not added to the water which had a pH of 7.5.

The separating column was divided into ten layers, and the amount of radioactive iodide adsorbed in each layer as radioactive iodine was determined. The results were as follows:

1st layer: 1.59% adsorbed radioactive iodine of the total injected radioiodine
2nd layer: 0.96% adsorbed radioactive iodine of the total injected radioiodine
3rd layer: 0.79% adsorbed radioactive iodine of the total injected radioiodine
4th layer: 0.12% adsorbed radioactive iodine of the total injected radioiodine
5th layer: 1.04% adsorbed radioactive iodine of the total injected radioiodine
6th layer: 1.15% adsorbed radioactive iodine of the total injected radioiodine
7th layer: 1.71% adsorbed radioactive iodine of the total injected radioiodine
8th layer: 1.73% adsorbed radioactive iodine of the total injected radioiodine
9th layer: 2.56% adsorbed radioactive iodine of the total injected radioiodine
10th layer: 3.47% adsorbed radioactive iodine of the total injected radioiodine

EXAMPLE VII

The procedure of Example VI was repeated, except that the pH of the river water was adjusted to 2.0 by addition of $H_2SO_4$ before the river water was passed through the column. The results were as follows:

1st layer: 12.9% adsorbed radioactive iodine of the total injected radioiodine
2nd layer: 16.1% adsorbed radioactive iodine of the total injected radioiodine
3rd layer: 13.8% adsorbed radioactive iodine of the total injected radioiodine
4th layer: 12.4% adsorbed radioactive iodine of the total injected radioiodine
5th layer: 11.4% adsorbed radioactive iodine of the total injected radioiodine
6th layer: 8.4% adsorbed radioactive iodine of the total injected radioiodine
7th layer: 7.1% adsorbed radioactive iodine of the total injected radioiodine
8th layer: 5.2% adsorbed radioactive iodine of the total injected radioiodine
9th layer: 3.8% adsorbed radioactive iodine of the total injected radioiodine
10th layer: 3.2% adsorbed radioactive iodine of the total injected radioiodine

EXAMPLE VIII

The procedure of Example VII was repeated, except the unsilvered activated carbon was replaced with a silvered activated carbon containing 1% silver. The results were as follows:

1st layer: 82.66% adsorbed radioactive iodine of the total injected radioiodine
2nd layer: 16.37% adsorbed radioactive iodine of the total injected radioiodine
3rd layer: 0.60% adsorbed radioactive iodine of the total injected radioiodine
4th layer: 0.12% adsorbed radioactive iodine of the total injected radioiodine
5th layer: 0.065% adsorbed radioactive iodine of the total injected radioiodine
6th layer: 0.04% adsorbed radioactive iodine of the total injected radioiodine
7th layer: 0.02% adsorbed radioactive iodine of the total injected radioiodine
8th layer: 0.024% adsorbed radioactive iodine of the total injected radioiodine
9th layer: 0.011% adsorbed radioactive iodine of the total injected radioiodine
10th layer: 0.005% adsorbed radioactive iodine of the total injected radioiodine Generally, the degree of separation decreases with an increase in the flow rate through the filter column. The reason for this may be that when iodide and iodate are both present, the oxidation of iodide and the reduction of iodate (or when iodide, iodate or the organically bound iodines, are present alone, their respective conversions) take place at given speeds so that defined periods of dwell in the column are required to obtain defined degrees of separation. By appropriate adaptation of the process conditions, such as, for example, by using larger columns, higher degrees of separation than those listed above can be obtained. Thus, the degree of separation of iodate according to Example III increases from 96.3% to 99.8% if the column volume is doubled.

For iodide as well as for iodate the degree of separation increases if an adsorber with a smaller grain size is used. Compare Example I with II and Example III with IV.

The separation rate of iodide is greater than that of iodate. For both compounds, approximately the same degrees of separation are obtained if the period of dwell for iodate is about 1.7 times longer than that for iodide. The experimentally determined separation rates for organic iodine compounds existing in natural waters are between those for iodide and iodate.

The present invention can be used in many different fields, among which are:

(a) enrichment of radioactive iodine from large-volume water samples (e.g. for analytical detection);

(b) decontamination of water if nuclear engineering problems are involved, possibly also decontamination of drinking water;

(c) use of the described reactions of iodine compounds under the influence of an acid environment for the filtering art in the field of air purification; and (d) use of the process for obtaining iodine from brines with high iodine content (iodine sources, etc.).

When the present invention is to be used for obtaining iodine from brines, activated carbon which is not impregnated with silver is preferably used since, on the one hand, the degree of separation need not be overly high and, on the other hand, elution of iodine from the absorber, e.g. with $SO_2$ solution, subsequent to the charging, is not interfered with. Particularly in this case, the acidification of the brine solution before introduction into the adsorber column can be effected in such a manner that the brine solution first passes through an ion exchanger which is present in the H form. The ion exchanger can also be used for decontamination. By passing the brine solution through such an ion exchanger, an acid is here formed of the neutral salt contained in the water so that the separate addition of acid from an outside source can be omitted entirely or in part. After leaving the adsorber column, the water is conducted through an exchanger column equipped with a highly acid cation exchanger in salt form so that the latter is recharged to the H form and the discharged water is neutralized. By using a plurality of (e.g. 4) ion exchanger columns which, after recharging to the H form or to the salt form, respectively, are switched to a corresponding position upstream or downstream of the adsorber column, it is possible to simultaneously reduce the acid requirement and to avoid excess acid in the waste water.

It will be understood that the above description of the present invention is susceptible to various modifications, changes and adaptations, and the same are intended to be comprehended within the meaning and range of equivalents of the appended claims.

What is claimed is:

1. Process for separating and collecting bound and also free iodine from a liquid phase, comprising adding an acid to the liquid phase, and then conducting the acidified liquid phase through an activated carbon filter to produce a chemical reaction at the activated carbon filter which frees the bound iodine, and the so freed iodine is then adsorbed at the activated carbon filter.

2. Process as defined in claim 1, wherein the iodine is present as at least one iodide, iodate or organic iodine compound.

3. Process as defined in claim 1 or 2, wherein the liquid phase is an aqueous solution.

4. Process as defined in claim 1 or 2, wherein the liquid phase is acidified to a pH of less than 7.

5. Process as defined in claim 1 or 2, wherein the activated carbon is held in a filter bed through which the liquid phase flows.

6. Process according to claim 1, wherein the liquid phase is natural waters, radioactive waters, or iodine containing brines.

7. Process according to claim 1, wherein the liquid phase contains radioactive iodine.

8. Process as defined in claim 1, wherein the activated carbon is a silvered activated carbon.

9. Process as defined in claim 1, wherein the activated carbon is an unsilvered activated carbon.

10. Process for separating and collecting bound and also free iodine from a gaseous phase, comprising adding an acid vapor to the gaseous phase, and then conducting the gaseous phase through an activated carbon filter to produce a chemical reaction at the activated carbon filter which frees the bound iodine, and the so freed iodine is then adsorbed at the activated carbon filter.

11. Process for separating and collecting bound and also free iodine from a gaseous phase, comprising impregnating an activated carbon filter with a liquid acid and conducting the gaseous phase through the activated carbon filter to produce a chemical reaction at the activated carbon filter which frees the bound iodine, and the so freed iodine is then adsorbed at the activated carbon filter.

12. Process as defined in claim 1, wherein the liquid phase contains iodide which is oxidized at the activated carbon filter to free iodine which is then adsorbed at the activated carbon.

13. Process as defined in claim 12, wherein free oxygen is dissolved in the liquid phase, and the free oxygen aids in the oxidation of the iodide at the activated carbon filter.

14. Process as defined in claim 1, wherein the liquid phase contains iodate which is reduced at the activated carbon filter to free iodine which is then adsorbed at the activated carbon.

15. Process as defined in claim 1, wherein the liquid phase contains an organic iodine compound, and the iodine from the organic compound is fixed at the activated carbon filter.

16. Process as defined in claim 1, wherein the chemical reaction and the adsorption occur substantially simultaneously.

* * * * *